United States Patent
Honnen et al.

[15] 3,671,511
[45] June 20, 1972

[54] PROCESS FOR PREPARING POLYOLEFIN-SUBSTITUTED AMINES

[72] Inventors: Lewis R. Honnen, 100 Sadler Lane, Petaluma, Calif. 94952; Harry W. Andrewsen, 795 Los Colindas Rd., San Rafael, Calif. 94903; Eddie G. Lindstrom, deceased, late of Martinez, Calif. 94553 by Jean H. Lindstrom, special administratrix

[22] Filed: April 23, 1970

[21] Appl. No.: 31,298

[52] U.S. Cl. ................260/93.7, 260/94.9 GB, 260/94.9 H, 260/94.8, 260/88.25, 260/96 HA, 260/585 A, 260/583 P, 252/50, 44/58
[51] Int. Cl. ....................C08f 27/08, C08f 314, C08f 27/02
[58] Field of Search.................260/94.9 GB, 94.9 H, 583 P, 260/93.7, 94.8, 585 A; 252/50

[56] References Cited

UNITED STATES PATENTS

| | | |
|---|---|---|
| 2,981,728 | 4/1961 | Lanning................................260/94.9 |
| 3,250,313 | 5/1966 | Irvin ........................................159/47 |
| 3,278,433 | 10/1966 | Feng....................................260/94.9 |
| 3,340,281 | 9/1967 | Brennen..........................260/94.9 X |
| 3,438,757 | 4/1969 | Honnen et al. ............................44/58 |
| 3,565,804 | 2/1971 | Honnen et al. ..........................252/50 |

Primary Examiner—James A. Seidleck
Assistant Examiner—William F. Hamrock
Attorney—A. L. Snow, Frank E. Johnston, G. F. Magdeburger, B. I. Rowland and J. D. Foster

[57] ABSTRACT

Polyolefin-substituted amines are prepared by chlorinating the polyolefin in an inert medium, removing the inert medium from the chlorinated polyolefin, reacting the chlorinated polyolefin with an excess of amine, removing excess amine for recycle by distillation under vacuum, and finishing the product by charging a diluent and an alkanol and washing, followed by removal of the alkanol and a portion of the diluent which are recycled.

6 Claims, 1 Drawing Figure

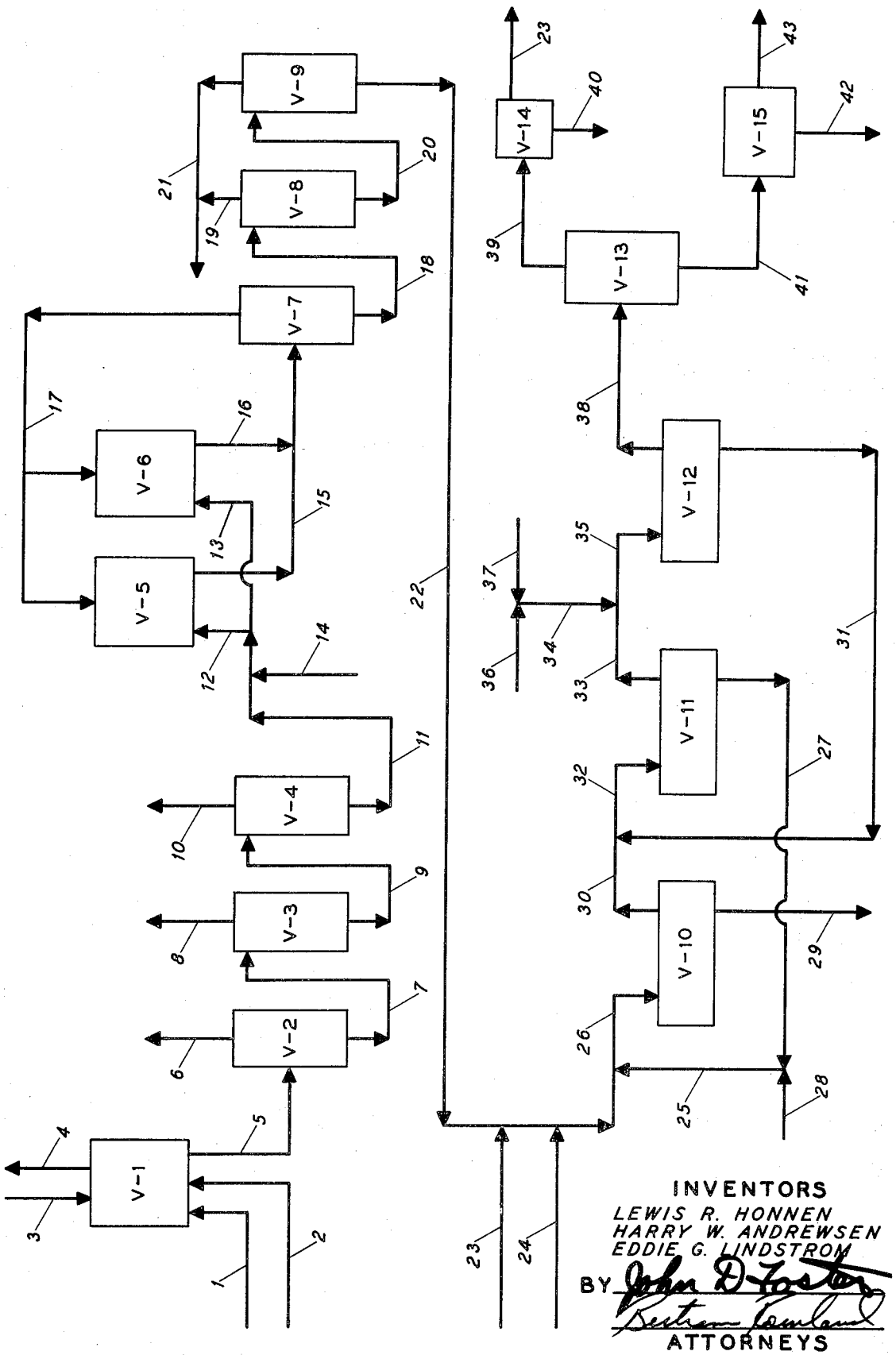

PROCESS FOR PREPARING POLYOLEFIN-SUBSTITUTED AMINES

BACKGROUND OF THE INVENTION

1. Field of the Invention

Polyolefin-substituted amines have recently been discovered to be useful as fuel additives (see U.S. Pat. No. 3,438,757). The preparation of these polyolefin-substituted amines is generally carried out by chlorinating a polyolefin followed by the reaction of the chlorinated polyolefin with the amine to form the polyolefin-substituted amines.

This invention is concerned with a process for the production of polyolefin-substituted amines, and more particularly with such a process where the desired products can be prepared efficiently in good yields with effective utilization of reactants, and the problems described above are substantially overcome.

2. Description of the Prior Art

U.S. Pat. No. 3,438,757 previously mentioned discloses preparation of hydrocarbyl amines by the chlorination of polyolefins and the subsequent reaction of the chlorinated polyolefin with the polyamine to obtain the desired hydrocarbyl amine.

British Pat. No. 1,096,320 teaches the preparation of amine additives by reacting a halogen containing hydrocarbon with an amine in the presence of hydrogen halide acceptors such as carbonates, bicarbonates, hydroxides, etc. The reference further discloses that the amine additives may be prepared by reaction of a large excess of starting amine with the halogen containing hydrocarbon. The reaction to form the amine additive is carried out at a room temperature of 20° to 200° C, preferably in the presence of an inert solvent.

U.S. Pat. No. 3,275,554 teaches the preparation of polyolefin-substituted polyamines by reaction of a halogenated hydrocarbon with a polyamine which may be used in an excess amount, preferably in a solvent having a boiling point of at least 160° F.

SUMMARY OF THE INVENTION

Polyolefin-substituted amines are prepared by chlorinating the polyolefin in an inert medium, removing the inert medium from the chlorinated polyolefin, reacting the chlorinated polyolefin with an excess of amine, removing excess amine for recycle by distillation under vacuum, and finishing the product by charging a diluent and an alkanol and washing followed by removal of the alkanol and a portion of the diluent which are recycled.

BRIEF DESCRIPTION OF THE DRAWING

The drawing is a schematic flow sheet of one embodiment of the invention whereby preparation of the polyolefin-substituted amine is achieved by a semi-continuous process.

DETAILED DESCRIPTION OF THE INVENTION

A more comprehensive understanding of the concept of this invention can be obtained by reference to the drawing.

Semi-Continuous Process

An inert medium by way of line 1 is introduced into reactor V-1 followed by the addition of a polyolefin by way of line 2. Chlorine is introduced into reactor V-1 by way of line 3. During the course of the reaction in vessel V-1 off-gas is removed from the reactor by line 4. This gas contains a portion of the inert medium, some small amount of chlorine and a major proportion of the hydrogen chloride formed in the reaction of the chlorine and polyolefin.

The chlorinated polyolefin together with the major proportion of the inert medium and some hydrogen chloride is removed by line 5 to a three-stage stripping section where the chlorinated polyolefin is separated from the inert medium and the remaining hydrogen chloride. The first stage denoted as V-2 is maintained at atmospheric or slightly elevated pressure and at an elevated temperature. The major portion of the hydrogen chloride introduced to the stripper V-2 by line 5 is removed in the overhead denoted as line 6 together with a portion of the inert medium.

The chlorinated polyolefin together with a minor quantity of hydrogen chloride and a major portion of the inert medium is introduced to the second stage of the stripping section denoted as V-3 by way of line 7. V-3 is maintained at a reduced pressure and at an elevated temperature. A major portion of the inert medium together with the remaining hydrogen chloride is removed in the overhead by way of line 8.

The chlorinated polyolefin together with a minor quantity of the inert medium is then sent by way of line 9 to the third stage of the stripping section denoted as V-4. V-4 is maintained at a reduced pressure and an elevated temperature such that substantially all of the remaining inert medium is separated from the chlorinated polyolefin and is removed in the overhead denoted as line 10.

Substantially pure chlorinated polyolefin then flows by way of lines 11, 12 and 13 to reactors V-5 and V-6 in alternate fashion, i.e., while the reaction of the chlorinated polyolefin and the amine is being carried out in V-5, stream 11 is being fed to V-6 and vice versa. The amine is introduced to line 11 carrying the chlorinated polyolefin by way of line 14 and the mixture is then introduced to reactor V-5 by way of line 12 or alternatively to reactor V-6 by way of line 13.

V-5 and V-6 are maintained at elevated pressures and temperatures while the reaction is carried out. Polyolefin-substituted amine is formed in reactors V-5 and V-6 together with a quantity of amine hydrochloride salts. Since an excess of amine is introduced into the reactors by way of lines 12 and 13, lines 15 and 16 which carry the reaction product to a surge tank V-7 and subsequently a two-stage stripping section denoted as V-8 and V-9 also contain excess amine which must be removed from the product.

The surge tank V-7 is maintained at the same pressure as the reactors and an elevated temperature. The surge tank serves to empty out the reactor V-5 or V-6 and allows continuous operation of the stripping section. Material can be recycled if desired to V-5 and V-6 by line 17.

The reaction product together with excess amine is sent to V-8 by line 18. A major portion of the amine is stripped from the polyolefin-substituted amine in this stage and is removed in the overhead denoted as line 19. Polyolefin-substituted amine together with amine hydrochloride salts and excess amine not removed by line 19 moves to the second stage of the stripping section denoted as V-9 by way of line 20. V-9 is maintained at an elevated temperature and a reduced pressure. The overhead from stripper V-9 denoted as line 21 carries with it most of the remaining excess amine. Lines 19 and 21 are combined and recycled to reactors V-5 and V-6 by line 14 which also contains fresh makeup amine.

Line 22 carries the polyolefin-substituted amine together with amine hydrochloride salts and a very minor amount of excess amine to a three-stage washing section which removes the amine hydrochloride salts from the desired product. Prior to the introduction of stream 22 into the first stage of the washing section denoted as V-10, streams 23, 24 and 25 are combined with stream 22 and this mixture is then fed into V-10 by way of line 26.

Line 23 contains recycled alkanol and diluent from V-14 (infra). Line 24 contains fresh makeup diluent. Line 25 is a combination of lines 27 and 28, line 27 being the wash water drawn off from V-11. Line 28 is a caustic solution. The aqueous phase from V-10 is removed by line 29 and sent to disposal.

The organic phase from V-10 is removed by line 30, combined with line 31 and introduced into the second stage V-11 by way of line 32. Line 31 is the aqueous wash phase from V-12.

The organic phase from V-11 is removed by line 33 combined with line 34 and introduced into the third stage V-12 by way of line 35. Line 34 contains fresh wash water from line 36 and alkanol from line 37. The organic phase from V-12 is transferred by line 38 to a stripper V-13.

The stripper is maintained at a reduced pressure and an elevated temperature. The overhead from V-13 is removed by line 39 and is made up of a portion of the diluent, and substantially all of the alkanol and water. Line 39 leads to a distillate receiver V-14 where the alkanol and diluent are separated from the water being sent to disposal by line 40 and the diluent and alkanol solvent mixture being recycled by line 23 to the washing section. The polyolefin-substituted amine in the diluent is then removed from V-13 by line 41 and sent to a filter V-15 where solids are removed by line 42 and the polyolefin-substituted amine in the diluent is then sent to storage by line 43.

Alternatively, the process can be carried out be deleting the two-stage stripping section denoted as V-8 and V-9 and removing all the excess amine in the washing operation.

PROCESS CONDITIONS

Certain of the process conditions set forth below are critical while others are optimal in that the desired product could be obtained by operation outside these ranges albeit not efficiently. The following paragraphs describe the operating ranges used in the process of this invention and for the achievement of the desired product.

Reactor V-1 is preferably operated at a pressure of from about 15 to about 75 psig and a temperature of from about 110° to 190° F. The reaction can be carried out at temperatures as low as about −40° F and as high as about 220° F, but at the low temperatures reaction does not proceed as rapidly as is desirable. When the reaction temperature exceeds 220° F, the nature of the chlorinated polyolefin is modified in an undesirable manner. The reaction of the chlorine with the polyolefin can be carried out at atmospheric pressure, but reactor vessel size is increased beyond desirable levels. The chlorine introduced into the vessel should be in the gaseous state to avoid local high concentrations of chlorine.

The three-stage striping section used to separate the inert medium from the chlorinated polyolefin is operated at increasing temperatures in increasing stages and conversely at decreasing pressures in increasing stages; that is, stage one denoted as V-2 in the drawing is maintained at a pressure ranging from atmospheric to about 25 psia and at a temperature of from about 135° to 175° F. The second stage denoted as V-3 is maintained at a pressure of from about 3 to about 8 psia and a temperature of about 250° to about 290° F. The third stage denoted as V-4 in the drawing is maintained at a pressure of about 0.1 to about 0.5 psia and a temperature of from about 290° to 310° F.

The conditions in the two-stage stripping section as specified are not critical but provide optimal conditions for removal of the inert medium.

The reaction of the amine with the chlorinated polyolefin in closed vessels V-5 and V-6 is carried out at pressures ranging from about atmospheric to the vapor pressure of the liquid medium and at a temperature ranging from about 150° to 390° F, preferably from about 275° to 325° F. The pressures are normally in the range of about 0 to 200 psig. It is critical that the temperature during the reaction of the amine and chlorinated polyolefin not exceed 390° F. since the desired product is not obtained due to thermal cracking at the amine ends and subsequent loss of nitrogen.

The two-stage stripping section denoted as V-8 and V-9 in the drawing operates at increasing temperatures and decreasing pressures in each subsequent stage; that is, V-8 is operated at a temperature of from about 310° to 325° F and a pressure from about 3 to 8 psia and V-9 is operated at a pressure of from about 0.2 to about 1 psia and a temperature of about 330° to 350° F. These conditions are used to maximize operating efficiency and no criticality is attached to them except to the extent that 390° F should not be exceeded since breakdown of the polyolefin-substituted amine would occur.

The washing of the polyolefin-substituted amine to remove amine hydrochloride salts is carried out at a temperature of from about 110° to about 220° F maximum, preferably at a range of from about 160° to 180° F. The temperature at which the washing of the product is carried out is determined by the viscosity of the organic phase to optimize handling of the product and maximize the settling rate or separation of the aqueous and organic phases. In line with this, the solvent acts as a diluent to reduce viscosity to an operable range while the alkanol acts to break or coalesce the emulsion and maximize the settling rate.

The alkanol, water and the portion of the solvent is optimally stripped from a polyolefin-substituted amine in V-13 at a temperature from about 280 to 310° F and a pressure of from about 5 to about 15 psia.

REACTANTS

Polyolefins

The polyolefins used in the subject invention include olefinic polymers derived from alkanes or alkenes with straight or branched chains. They are usually prepared by polymerizing olefins or from two to six carbon atoms (ethylene being copolymerized with another olefin so as to provide a branched chain). Branched chain polyolefin will generally have at least one branch per six carbon atoms along the chain, preferably at least one branch per four carbon atoms along the chain. Particularly useful polyolefins are polypropylene and polyisobutylene. The branches will be from one to two carbon atoms, usually preferably one carbon atom, i.e., methyl.

In most instances, the composition of this invention is not a pure or single product but rather a mixture of compounds having an average molecular weight. Usually the range of molecular weights will be relatively narrow and peaked near the indicated molecular weight. Particularly preferred are those polyolefins having a molecular weight in the range from about 500 to about 3,000. As previously pointed out, preferred olefinic polymers are polyisobutylene and polypropylene. Therefore, particularly preferred polyolefins are polyisobutylene and polypropylene having molecular weights in the range of 500 to 3,000.

Amines

The amines used to form the detergent polymers by the process of this invention encompass both primary and secondary monoamines as well as primary and secondary polyamines. U.S. Pat. No. 3,438,757 disclosed in detail the type of amines which may be used in the subject invention. When the lower molecular weight primary amines such as monomethylamine and ammonia are used, higher pressures than those specified for the reaction vessels V-5 and V-6 may be employed.

A preferred group of amines are the aliphatic polyamines, both primary and secondary in nature, such as ethylene diamine, diethylene triamine, triethylene tetraamine, propylene diamine, butylene diamine, trimethyl trimethylene diamine, tetramethylene diamine, pentamethylene diamine, diamino hexane, hexamethylene diamine, heptamethylene diamine, etc. It should be understood that as in the case of the polyolefins used in this invention, the compositions of the complicated polyamines may be mixtures having as the major product a compound indicated as the composition and having minor amounts of analogous compounds relatively close in compositions to the dominant compounds. It should be understood that where used herein the term amine does not necessarily refer to an anhydrous product but may be a concentrated aqueous solution. Further, when amines such as tetraethylene pentaamine and other amines with high boiling points are used, the stripping section denoted as V-8 and V-9 should be deleted and the separation of the excess amine carried out in the washing operation.

INERT REACTION MEDIUM, DILUENT, AND ALKANOL

Polyolefin Chlorination Inert Reaction Medium

The inert medium referred to in the description of the process of this invention serves primarily to reduce the viscosity of the polyolefin, thereby increasing the workability of the system by (1) allowing the mixture to be pumped using conventional equipment and (2) achieving good mixing of the polyolefin with the chlorine.

The use of the inert medium also allows control of foaming which can be a problem in the chlorination of polyolefins. The foaming can be controlled by increasing the quantity of inert medium present, thereby reducing the viscosity. Further, utilization of the chlorine when the reaction is carried out in an inert medium is nearly 100 percent, while utilization when the reaction is carried out neat at the temperatures specified herein is only about 10 percent.

To be suitable, the inert medium used in the chlorination of the polyolefin in the subject process must not react with either of the reactants, i.e., the chlorine or the polyolefin. Benzene is the preferred medium for carrying out the chlorination, but saturated unbranched aliphatics, such as hexane, n-heptane, and n-octane, as well as saturated halogenated aliphatics such as carbon tetrachloride, are also satisfactory.

Diluent

The diluent used in the subject invention which is introduced just prior to the washing of the polyolefin-substituted amine, serves primarily to reduce the viscosity of the product, thereby improving its workability, i.e., improving its pumping characteristics and enhancing the separation of the organic phase from the aqueous phase in the wash process. By charging a diluent to the system, rapid settling can be obtained. The preferred diluent is an alkyl aromatic such as xylene. N-heptane and other hydrocarbons are also satisfactory. A practical limitation in determining the suitability of the diluent used is the flash point of the mixture of the polyolefin-substituted amine and diluent, since subsequent shipping would be hazardous where the flash point of the mixture is too low.

Alkanol

The alkanols used in this invention in the washing operation serve to break or coalesce the emulsion that occurs when polyolefin-substituted amines which act as surfactants are contacted with water. As shown in the example, infra, n-butanol is preferred because of its effectiveness at low concentration levels, the limited loss due to retention in the aqueous phase, and its volatility in the shipping phase. Isobutanol is also a preferred alkanol.

Other alcohols, such as methanol, ethanol, propanol, n-pentane, and the $C_6$–$C_8$ alcohols are also satisfactory, e.g., 2-ethylhexanol, etc.

PROPORTIONS OF REACTANTS, INERT REACTION MEDIUM, DILUENT AND ALKANOL

While the exact nature of the product obtained and generically described as a polyolefin-substituted polyamine is not fully known, the most desirable product is obtained by carrying out the reactions to form the product with certain proportions of reactants.

In chlorinating the polyolefin, the ratio of moles of chlorine to moles of polyolefin is within the range of 0.5–5.0 moles of chlorine to 1 mole of polyolefin and is preferably in the range of 1.2–2.4 moles of chlorine to mole of polyolefin.

Inert medium used in the chlorination step constitutes from about 10 to about 50 percent by weight of the material charged to the reactor and is preferably in the range from about 15 to about 30 percent by weight.

In the reaction of the halogenated polyolefin with the amine, the amine is preferably used in excess since a high nitrogen level is preferred in the final product. From about 1 to 6 moles of amine per gram atom of chlorine in the halogenated polyolefin may be used with the preferred range of from about 3 to about 4 moles of the amine per gram atom of chlorine in the halogenated polyolefin. The diluent which is mixed with the polyolefin-substituted amine prior to washing is used in an amount ranging from about 1 to about 4 volumes of the diluent per 1 volume of the polyolefin-substituted amine. When a temperature is used in washing which is in the lower portion of the range specified, the larger ratio of diluent to polyolefin-substituted amine is required to maintain viscosity and optimize separation of the organic and aqueous phases.

The alkanol is used on a volume basis in an amount ranging from 0.10 to about 0.2 volumes of alkanol per volume of polyolefin-substituted amine. The lower limit specified, i.e., 0.10 constitutes a critical limitation in that if any less is used the emulsions formed when the polyolefin-substituted amine contacts the water will not be effectively broken and phase separation will not occur.

The first wash used is preferably a caustic wash to neutralize the amine hydrochloride salts which are formed. Sufficient caustic is used to neutralize substantially all the amine hydrochloride salts and an excess of about 15 percent is preferred. Adequate washing can be obtained without caustic and when no caustic is used, line 32 in the drawing is eliminated with water only being introduced by line 36.

Example

This example illustrates why n-butanol is a preferred alcohol for breaking or coalescing the emulsion that results when polyolefin-substituted polyamines are washed with water.

A series of samples were prepared using in each (1) 15 grams of polyisobutylene ethylene diamine, (2) 15 grams of xylene as a solvent, (3) 1, 2 or 4 grams of a given alcohol, and (4) a succession of 10 grams water washes which were mixed by vigorous shaking and settled at 170° F.

The alcohols were first compared qualitatively. The 1, 2 and 4 gram alcohol levels are equal to 3.2 percent, 6.25 percent and 11.7 percent by weight alcohol, respectively, based on the total organic phase charged. Using the amount of clear water separated after one-half hour as the criterion, n-butanol was found to be moderately effective while the other six alcohols were ineffective at the 3.2 percent by weight level. At 6.25 percent butanol gave 100 percent separation while isopropyl and n-amyl alcohol gave 60 to 80 percent separation on the first wash. The other four alcohols tested were ineffective. At 11.7 percent concentration, all of these alcohols gave good results on the first wash. The aqueous phases (from washes with the alcohols) were analyzed by vapor phase chromotography. The partition coefficients, i.e., the ratio of the concentration of alcohol in the aqueous phase to that in the oil phase were calculated with the results shown in Table I below.

TABLE I

| Alcohol | Initial concentration in oil phase, weight percent | Concentration in wash, weight percent by VPC | | | K, calculated from data on washes | | | Percent of alcohol charged[1] |
|---|---|---|---|---|---|---|---|---|
| | | First | Second | Third | First | Second | Third | |
| Isopropyl | 6.25 | 6.56 | 5.44 | ........ | 1.6 | 2.35 | ........ | 44 |
| | 11.7 | 14.9 | 9.30 | ........ | 2.1 | 2.6 | ........ | 36 |
| n-Butyl | 6.25 | 2.9 | 2.52 | 2.25 | 0.54 | 0.56 | 0.58 | 73 |
| | 11.7 | 3.52 | 3.36 | 3.25 | 0.33 | 0.33 | 0.36 | 75 |
| n-Amyl | 11.7 | 0.92 | 1.00 | 0.95 | ........ | 0.11 | ........ | 92.8 |
| n-Hexyl | 11.7 | 0.25 | 0.23 | 0.25 | ........ | 0.028 | ........ | 98.2 |
| 2-methyl-1-pentanol | 11.7 | 0.33 | 0.29 | 0.30 | ........ | 0.034 | ........ | 97.5 |

[1] Left in washed oil phase.

Under the column above denoted as "% of Alcohol Charged Left in Washed Oil Phase" the values given for isopropyl, i.e., 44 and 36, represent the amount of isopropanol left after two washes since the third wash separated slowly and incompletely. The values for K given for n-amyl alcohol, n-hexyl alcohol, and 2-methyl-1-pentanol represent the average for the three washes in each case. The results set forth in Table I above show that the use of about 12 percent of the $C_6$ and $C_5$ alcohol permits washing polyolefin-substituted polyamines with only 2 to 7 percent loss of alcohol in the three washes with n-butanol loss to the three washes as 25 to 30 percent, but butanol is effective at half or less than half the concentration needed with the $C_5$ and $C_6$ alcohols. Isopropanol is effective, but some problems with regard to separation occur and the loss of isopropyl alcohol is about 50 percent greater than with n-butanol.

It is apparent that many widely different embodiments of this invention may be made without departing from the scope and spirit thereof; and, therefore, it is not intended to be limited except as indicated in the appended claims.

What is claimed is:

1. A process for the preparation of a polyolefin-substituted amine comprising (1) contacting a polyolefin of from about 500 to about 3,000 molecular weight and chlorine in a mole ratio of from 0.5 to 5.0 moles of chlorine per 1.0 mole of polyolefin in an inert medium at a temperature of from about −40° to about 220° F. at a pressure ranging from about atmospheric to about 75 psig to form a chlorinated polyolefin and hydrogen chloride, (2) stripping said inert medium and said hydrogen chloride from the system in a multi-stage stripping section operating at increasing temperatures in increasing stages and decreasing pressures in increasing stages, (3) contacting a primary or secondary amine with said chlorinated polyolefin at a ratio of from 1 to 6 moles of amine per gram-atom of chlorine in said chlorinated polyolefin at a temperature of from about 150° to 390° F under a pressure in the range of from about atmospheric to the vapor pressure of the system to form polyolefin-substituted amine and amine hydrochloride salt, (4) charging a diluent, an alkanol, and wash water to the system in amounts of from about 1 to about 4 volumes of the diluent per 1 volume of the said polyolefin-substituted amine and not less than 0.10 volume of alkanol per volume of polyolefin-substituted amine, (5) washing the system to separate the said amine-hydrochloride salt and excess unreacted amine from the said polyolefin-substituted amine at a temperature not exceeding about 220° F maximum, and (6) stripping said alkanol, said water, and a portion of said diluent from said polyolefin-substituted amine.

2. The process of claim 1 wherein the major portion of said excess unreacted amine is removed from said system prior to said charging of said diluent, alkanol, and wash water by stripping at elevated temperatures and reduced pressures.

3. The process of claim 2 wherein said stripping of said inert medium and said hydrogen chloride is carried out in a three-stage operation wherein the first stage operates at a pressure ranging from atmospheric to about 25 psia and at a temperature of from about 135° to 175° F, the second stage operates at a pressure of from about 3 to about 8 psia at a temperature of from about 250° to about 290° F, and the third stage operates at a pressure of from about 0.1 to about 0.5 psia and a temperature of from about 290° to about 310° F, said stripping of said major portion of said excess of reacted amine is carried out in a two-stage operation, operating at elevated temperatures and subatmospheric pressures and with the proviso that the second stage is operating at a higher temperature and a lower pressure than the first stage and that the temperature in said two-stage operation does not exceed 390° F, and said washing is carried out in a three-stage, counter-current washing section at a temperature of from about 110° to said 220° F.

4. The process of claim 3 wherein a caustic solution is introduced into the first stage of said three-stage washing operation in an amount ranging from sufficient to neutralize substantially all the amine hydrogen chloride salts present in said system up to an amount such that 15 percent excess caustic is present.

5. The process of claim 4 wherein the ratio of said polyolefin and said chlorine is in the range of 1.2–2.4 moles of chlorine per mole of polyolefin, the mole ratio of said amine to said chlorinated polyolefin is in the range of from 3–4 moles of said amine per gram-atom of chlorine in said chlorinated polyolefin, said inert medium utilized in the formation of the said chlorinated polyolefin is benzene used in an amount to constitute from about 10 to about 50 percent by weight of the composite of said chlorine, said polyolefin and said inert medium, and said alkanol is n-butanol.

6. The process of claim 5 wherein said benzene is used in an amount of from about 15 to about 30 percent by weight and said n-butanol is used in an amount ranging from 0.10 to 0.2 volume per volume of said polyolefin-substituted amine.

* * * * *